(12) United States Patent
Soto

(10) Patent No.: US 8,047,346 B2
(45) Date of Patent: Nov. 1, 2011

(54) PILOT FOR A SERIES DAMPER

(75) Inventor: Andre Soto, Tallmadge, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 389 days.

(21) Appl. No.: 12/288,759

(22) Filed: Oct. 23, 2008

(65) Prior Publication Data

US 2009/0108512 A1 Apr. 30, 2009

Related U.S. Application Data

(60) Provisional application No. 61/000,303, filed on Oct. 25, 2007.

(51) Int. Cl.
*F16D 33/18* (2006.01)
(52) U.S. Cl. ........................ 192/3.29; 464/68.6; 464/68.8
(58) Field of Classification Search ........ 464/68.6–68.8; 192/204, 3.29, 3.3, 3.33
See application file for complete search history.

(56) References Cited

U.S. PATENT DOCUMENTS

| | | | | |
|---|---|---|---|---|
| 922,805 | A * | 5/1909 | Nelson et al. | |
| 4,651,859 | A * | 3/1987 | Frantz et al. | 192/204 X |
| 5,117,959 | A * | 6/1992 | Graton | |
| 6,056,103 | A * | 5/2000 | Hashimoto et al. | |
| 6,273,226 | B1 | 8/2001 | Hönemann et al. | |
| 7,066,312 | B2 * | 6/2006 | Abe et al. | 192/3.29 |
| 7,077,253 | B2 | 7/2006 | Maienschein | |

* cited by examiner

*Primary Examiner* — Gregory Binda
(74) *Attorney, Agent, or Firm* — Simpson & Simpson, PLLC

(57) ABSTRACT

A damper for a torque converter, including: a cover plate for a damper; a turbine hub with a surface; and a pilot element rotationally connected to the cover plate and having a surface slidingly engaged with the surface for the turbine hub. The respective surfaces for the turbine hub and the pilot element are at least partially radially aligned and the pilot element is arranged to center the damper with respect to a longitudinal axis for the torque converter. In some aspects, the pilot element includes at least one axial protrusion engaged with the cover plate. In some aspects, the pilot element is formed of stamped metal. In some aspects, the pilot element is axially stabilized with respect to the turbine hub and the cover plate. In some aspects, the pilot element includes at least one radial protrusion slidingly engaged with a radial surface for the turbine hub.

20 Claims, 4 Drawing Sheets

US 8,047,346 B2

PILOT FOR A SERIES DAMPER

CROSS-REFERENCE TO RELATED APPLICATIONS

This application claims the benefit under 35 U.S.C. §119 (e) of U.S. Provisional Application No. 61/000,303, filed on Oct. 25, 2007 and incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a stamped metal pilot for radially centering a series damper.

BACKGROUND OF THE INVENTION

It is known to radially center a series damper in a torque converter by securing a cover plate for one of the dampers in the series damper directly to a turbine hub in the torque converter, for example, by riveting the cover to the hub such that radial surfaces for the cover and the hub are in contact. Unfortunately, the above configuration limits the options available for providing hysteresis forces for the series damper while using a maximum number of components in all the configurations.

Thus, there is a long-felt need for a means of radially centering a series damper in a torque converter while optimizing the modularity of the series damper and the options for providing hysteresis in the series damper.

BRIEF SUMMARY OF THE INVENTION

The present invention broadly comprises a damper for a torque converter, including: a cover plate for a first damper; a turbine hub with a surface; and a pilot element rotationally connected to the cover plate and having a surface slidingly engaged with the surface for the turbine hub. The respective surfaces for the turbine hub and the pilot element are at least partially radially aligned and the pilot element is arranged to center the first damper with respect to a longitudinal axis for the torque converter.

In some aspects, the respective surfaces for the turbine hub and the pilot element are axially disposed. In some aspects, the pilot element includes a substantially annular portion including the surface for the pilot element and the surface for the pilot element faces radially inward. In some aspects, the surface of the turbine hub faces radially outward. In some aspects, the pilot element includes at least one axial protrusion engaged with the cover plate. In some aspects, the pilot element is formed of stamped metal. In some aspects, the pilot element is axially stabilized with respect to the turbine hub and the cover plate. In some aspects, the pilot element includes at least one radial protrusion slidingly engaged with a radial surface for the turbine hub. In some aspects, axial movement of the pilot element away from the turbine hub is restricted by contact between the pilot element and the cover plate. In some aspects, the first damper is part of a series damper including a second damper with a flange, the second damper is disposed radially beyond the first damper and the cover plate includes the flange.

The present invention also broadly comprises a pilot element for a damper in a torque converter, including: a first segment rotationally connected to a cover plate for a first damper; and a substantially annular second segment with a surface arranged to slidingly engage with a surface for a turbine hub. The respective surfaces for the second segment and the turbine hub are arranged to be at least partially radially aligned and the first and second segments are arranged to radially center the first damper in the torque converter.

In some aspects, the first segment includes at least one protrusion arranged to connect to the cover plate. In some aspects, the first segment is disposed radially beyond the second segment when the pilot element is disposed in the torque converter. In some aspects, the respective surfaces for the second segment and the turbine hub are axially disposed. In some aspects, the pilot element is formed of stamped metal. In some aspects, the first damper is part of a series damper including a second damper with a flange, the second damper is disposed radially beyond the first damper and the cover plate includes the flange. In some aspects, the pilot element is arranged to be axially stabilized with respect to the turbine hub and the cover plate. In some aspects, the pilot element includes at least one radial protrusion arranged to slidingly engage with a radial surface for the turbine hub. In some aspects, axial movement of the pilot element away from the turbine hub is arranged to be restricted by contact between the pilot element and the cover plate.

It is a general object of the present invention to provide a means of radially centering a series damper in a torque converter while optimizing the modularity of the series damper and the options for providing hysteresis in the series damper.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 3 is side view of the pilot element shown in FIG. 2; and,

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
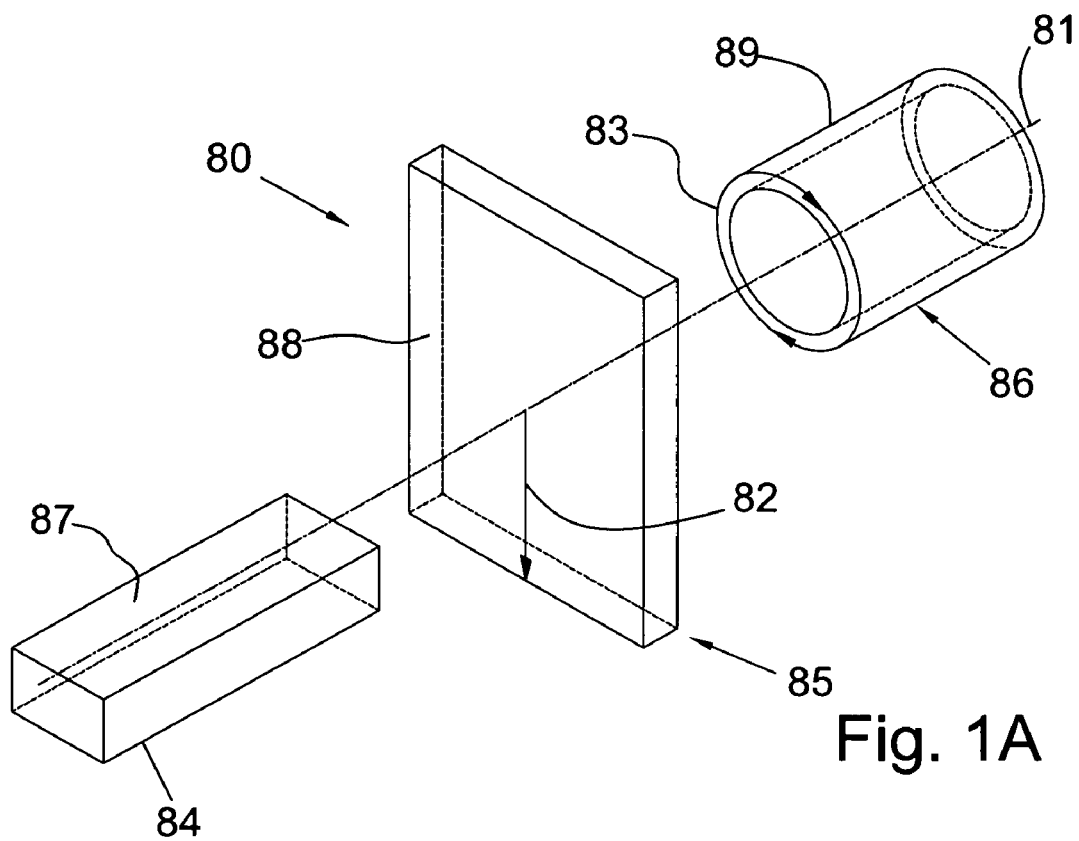
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
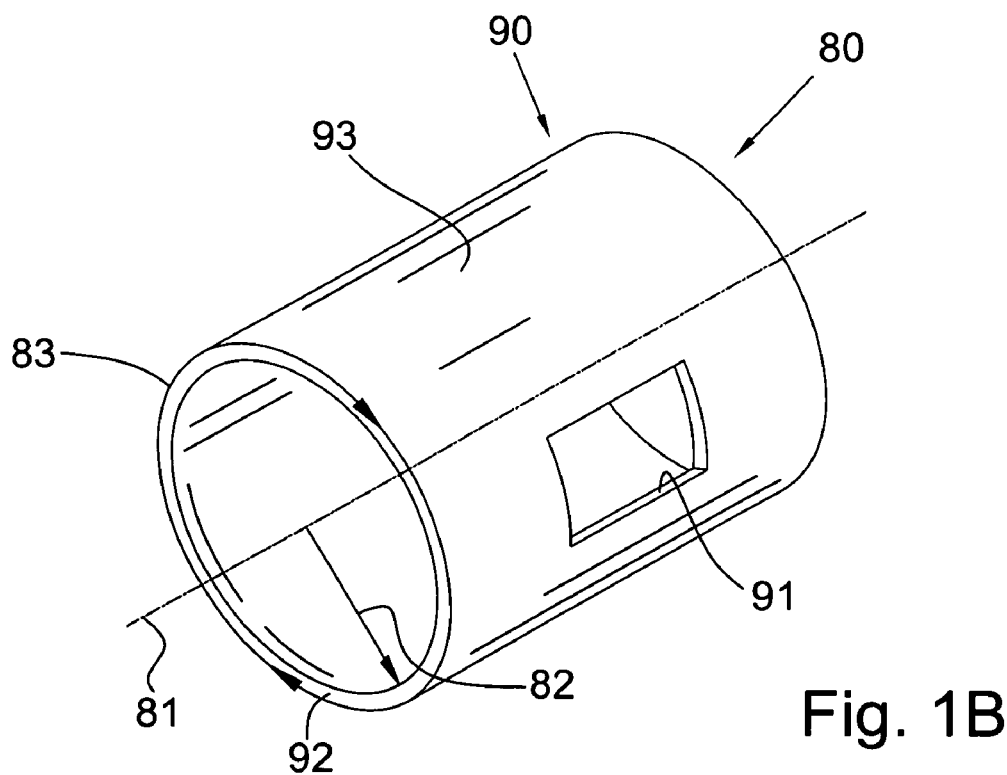
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
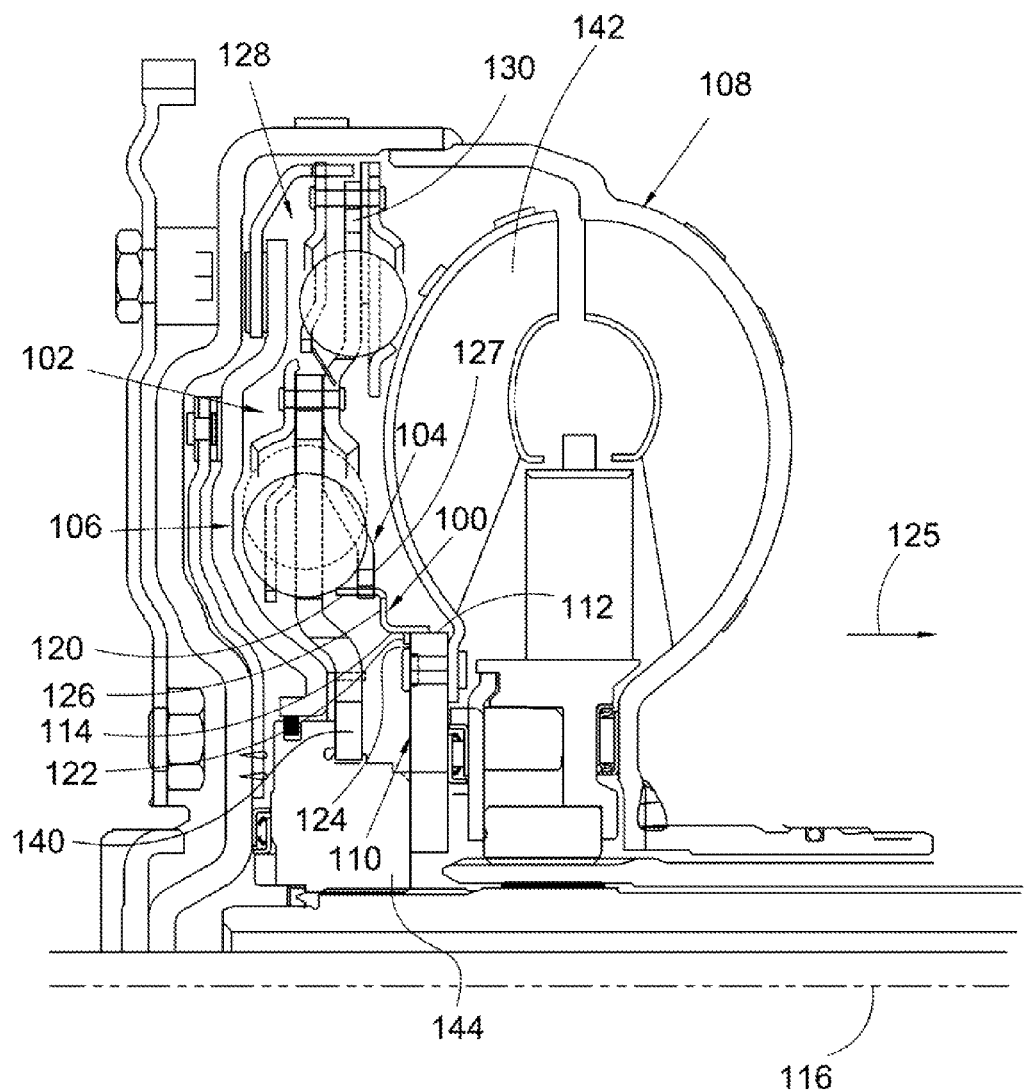
FIG. 2 is a partial cross-sectional view of a present invention pilot element in a series damper in a torque converter.

FIG. 2 is a partial cross-sectional view of present invention pilot element 100 in a series damper in a torque converter.

Figure 3:
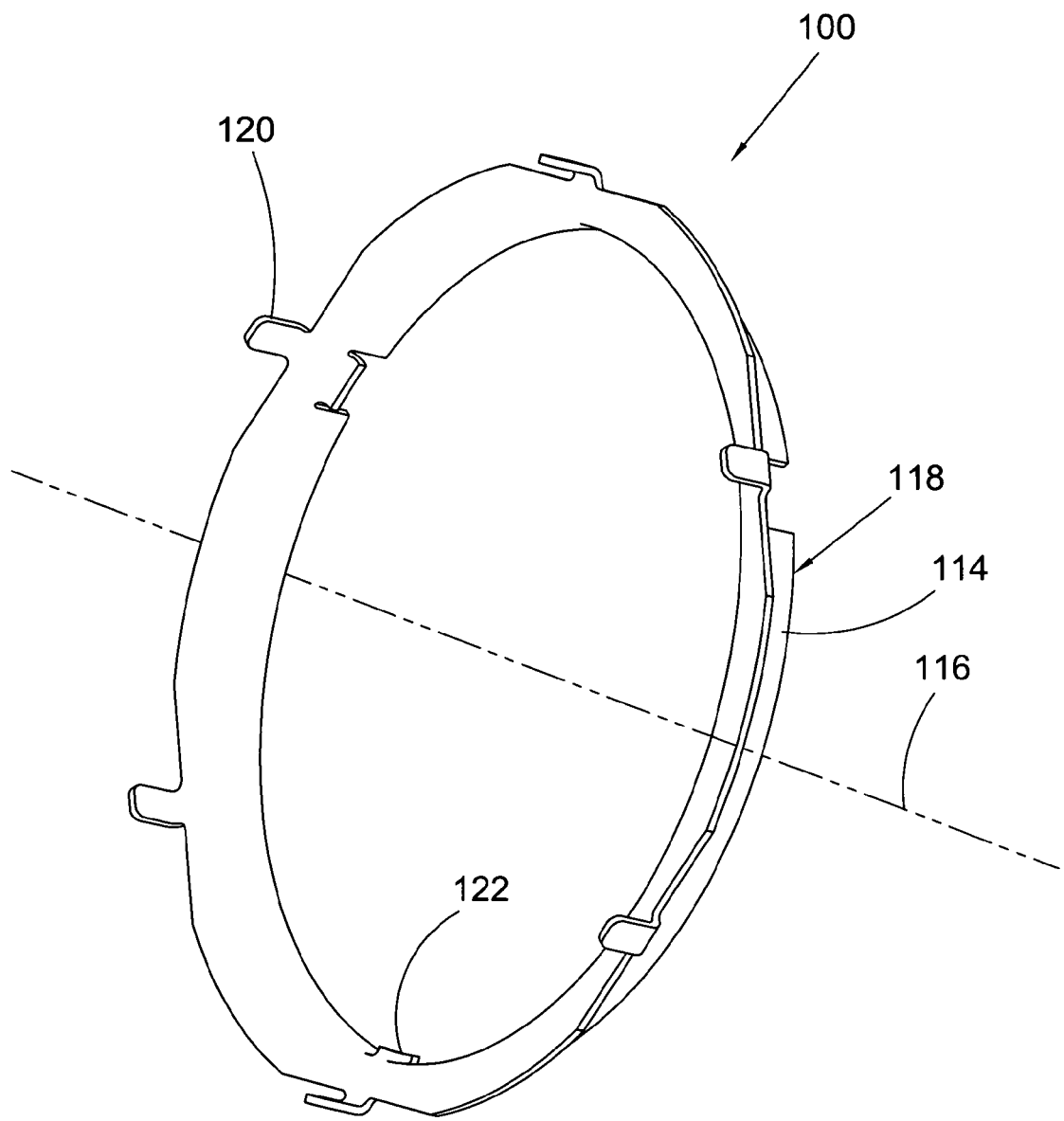
FIG. 3 is front perspective view of the pilot element shown in FIG. 2.

FIG. 3 is front perspective view of pilot element 100 shown in FIG. 2.

Figure 4:
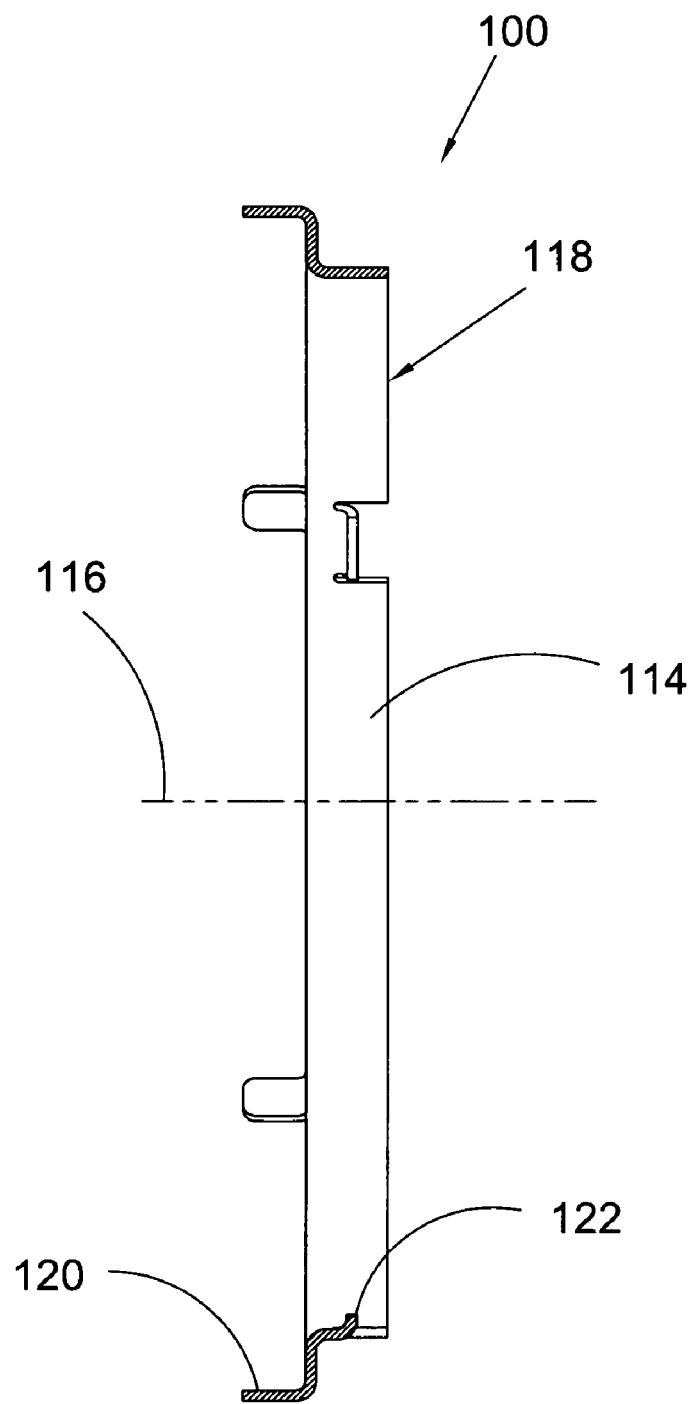
FIG. 4 is a side view of the pilot element shown in FIG. 2.

FIG. 4 is a side view of pilot element 100 shown in FIG. 2. The following should be viewed in light of FIGS. 2 through 4. In the figures, a present invention pilot element is shown in a series damper; however, it should be understood that a present invention pilot element could be used in a damper that is not part of a series damper. Series damper 102 includes cover plate 104 for damper 106. Damper 106 includes flange 140, separate from plate 104. Torque converter 108 includes turbine 142 and turbine hub 110 with surface 112. Hub 144 is arranged to transmit torque from damper 106. Pilot element 100 is a separate piece from the cover plate, that is, the element is separately formed from the cover plate, and is rotationally connected to the cover plate. By rotationally connected, or secured, we mean that the pilot element and the cover plate are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

Element 100 includes surface 114 slidingly engaged with surface 112. By slidingly engaged we mean that the surfaces are in contact and exert respective pressures on each other substantially orthogonal to the surfaces, while still being rotatable with respect to one another. The respective surfaces for the turbine hub and the pilot element are at least partially radially aligned and the pilot element is arranged to center damper 106 with respect to longitudinal axis 116 for the torque converter. In some aspects, the respective surfaces for the turbine hub and the pilot element are axially disposed. That is, the surfaces are parallel to axis 116. The pilot element includes substantially annular portion 118 including surface 114. In some aspects, surface 114 faces radially inward.

The pilot element is attached to the cover plate using any means known in the art. In some aspects, to minimize the cost and complexity of attaching the pilot element, the pilot element includes at least one axial protrusion 120 engaged with the cover plate. The cover plate includes slots, openings, or recesses that accept the axial protrusions. Thus, the protrusions are easily axially inserted into the cover plate to rotationally connect the pilot element and the cover plate. The pilot element can be used with any damper having a cover plate with appropriate slots, openings, or recesses as noted above. These slots, openings, or recesses can easily be added to a wide variety of damper configurations or may already be present in a wide variety of damper configurations, advantageously increasing the modularity of these configurations. For example, a flange in a series damper (not shown) that connects a cover plate to a turbine hub to create a configuration providing hysteresis in the damper could be used with element 100 with little or no modification of the flange. Element 100 is not limited to a particular size, number, shape, or configuration of protrusions 120.

In some aspects, the pilot element is axially stabilized with respect to the turbine hub through radial protrusions 122. Protrusions 122 slidingly engage with radial surface 124 of hub 110 to restrict axial movement of the pilot element in direction 125, while enabling the pilot element to rotate with respect to the hub. Element 100 is not limited to a particular size, number, shape, or configuration of protrusions 122. In some aspects, the pilot element is axially stabilized with respect to cover plate 104 through contact of radial surface 126 of the pilot element with radial surface 127 of the cover plate. That is, contact between the radial surfaces restricts movement of the pilot element away from the turbine hub and ensures that the pilot element will maintain contact with axial surface 112.

In some aspects, damper 102 includes damper 128 with flange 130. Damper 128 is disposed radially beyond damper 106 and cover plate 104 includes flange 130.

The pilot element can be formed using any material or fabricating process known in the art. In some aspects, the pilot element is formed of stamped metal.

It should be understood that pilot element 100 is not limited to the size, shape, or configuration shown and that other sizes, shapes, and configurations are within the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
   a turbine;
   a turbine hub connected to the turbine and including a surface;
   a first damper including:
      a first hub arranged to transmit torque from the first damper;
      a first flange rotationally connected to the first hub; and,
      a cover plate; and,
   a pilot element separately formed from the cover plate and rotationally connected to the cover plate and having a surface slidingly engaged with the surface for the turbine hub, where the respective surfaces for the turbine hub and the pilot element are at least partially radially aligned and the pilot element is arranged to center the first damper with respect to a longitudinal axis for the torque converter.

2. The torque converter of claim 1 wherein the respective surfaces for the turbine hub and the pilot element are axially disposed.

3. The torque converter of claim 1 wherein the pilot element includes a substantially annular portion including the surface for the pilot element and wherein the surface for the pilot element faces radially inward.

4. The torque converter of claim 1 wherein the surface of the turbine hub faces radially outward.

5. The torque converter of claim 1 wherein the pilot element includes at least one axial protrusion engaged with the cover plate.

6. The torque converter of claim 1 wherein the pilot element is formed of stamped metal.

7. The torque converter of claim 1 wherein the pilot element is axially stabilized with respect to the turbine hub and the cover plate.

8. The torque converter of claim 7 wherein the pilot element includes at least one radial protrusion slidingly engaged with a radial surface for the turbine hub.

9. The torque converter of claim 7 wherein axial movement of the pilot element away from the turbine hub is restricted by contact between the pilot element and the cover plate.

10. The torque converter of claim 1 wherein the first damper is part of a series damper including a second damper with a second flange, the second damper disposed radially beyond the first damper and wherein the cover plate includes the second flange.

11. A torque converter, comprising:
    a turbine;
    a turbine hub connected to the turbine and including a surface;
    a first damper including:
       a first flange; and,
       a cover plate, separate from the first flange; and,
    a pilot element including:
       a first axially extending segment rotationally connected to the cover plate; and,
       a substantially annular second segment with a circumferential surface arranged to slidingly engage with the surface for the turbine hub, where the respective surfaces for the second segment and the turbine hub are arranged to be at least partially radially aligned and the first and second segments are arranged to radially center the first damper in the torque converter.

12. The torque converter of claim 11 wherein the first axially extending segment includes at least one protrusion arranged to connect to the cover plate.

13. The torque converter of claim 11 wherein the first axially extending segment is disposed radially beyond the second segment when the pilot element is disposed in the torque converter.

14. The torque converter of claim 11 wherein the respective surfaces for the second segment and the turbine hub are axially disposed.

15. The torque converter of claim 11 wherein the pilot element is formed of stamped metal.

16. The torque converter of claim 11 wherein the first damper is part of a series damper including a second damper with a second flange, the second damper is disposed radially beyond the first damper, and the cover plate includes the second flange.

17. The torque converter of claim 11 wherein the pilot element is arranged to be axially stabilized with respect to the turbine hub and the cover plate.

18. The torque converter of claim 17 wherein the pilot element includes at least one radial protrusion arranged to slidingly engage with a radial surface for the turbine hub.

19. The torque converter of claim 17 wherein axial movement of the pilot element away from the turbine hub is arranged to be restricted by contact between the pilot element and the cover plate.

20. A torque converter, comprising:
    a turbine;
    a turbine hub, fixedly connected to the turbine, and with:
       a first circumferential surface; and,
       and a radial surface;
    a first damper including:
       a cover plate; and,
       a first plurality of circumferentially aligned springs;
    a second damper including:
       a second plurality of circumferentially aligned springs, radially outward from the first plurality of springs; and,
       a flange fixedly secured to the cover plate; and,
    a stamped metal pilot element rotationally connected to the cover plate with at least one axial protrusion, the pilot element including a substantially annular portion having a second circumferential surface facing radially inward and slidingly engaged with the first circumferential surface for the turbine hub, and the annular portion having at least one radial protrusion slidingly engaged with the radial surface for the turbine hub, wherein the pilot element centers the series damper with respect to a longitudinal axis for the torque converter.

* * * * *